3,047,396
PREPARATION OF TEA BEVERAGE AND
PRODUCTS USED THEREIN
Marvin D. Steinberg, 136 Gaylor Road, Eastchester, N.Y.
No Drawing. Filed Mar. 29, 1960, Ser. No. 18,239
5 Claims. (Cl. 99—77)

This invention relates to improvements in the preparation of the beverage, tea, and to the products used therein.

Tea is usually prepared by steeping the dried leaves of the tea plant in hot or boiling water. The resulting infusion is widely employed as a common beverage. Much lore, ceremony and customs have been built around the steeping and preparation of this beverage infusion.

The dried tea leaves are produced in many exotic and strange places and are a common article of commerce. Like many plant products they contain, among many other constituents, a class of chemical compounds called tannins. These tannins may comprise a substantial proportion of the tea leaves. It may vary from about 4% to 23% of the dry weight depending upon the type and source of the tea leaves. An average cup of tea may therefore contain a substantial dose of tannin.

The tannin bodies in tea are astringent, bitter tasting substances. Because of this, the time and temperature conditions of the steeping of the tea leaves in the hot water are adjusted in an attempt to dissolve the caffeine and the volatile flavoring constituents without concurrently dissolving the tannin bodies. These attempts are not successful because of the ready solubility of the tannin bodies in hot water. The infusion contains substantially all of the tannin in the tea leaves.

The presence of this tannin in the tea infusion produces an astringent bitter flavor in an otherwise pleasant tasting drink. In addition it has been shown that continued ingestion of tannins may be harmful to the health. In a recent paper by Dr. B. Korpassy in Cancer Research, volume 19, pages 501–4 (1959), on "The Heptacorcinogenicity of Tannic Acid," it was shown that repeated ingestion of tannic acid causes severe liver damage, cirrhosis and the induction of liver tumors. Dr. Korpassy pointed out that a cup of tea may contain from 94 to 475 milligrams of tannic acid, a significant dose. He also refers to other papers in the medical literature on the hepatotoxic action of tannic acid.

An object of my invention as described in this specification is to produce a tea beverage in which the tannin content is lowered or is completely absent.

Another object of my invention is to produce a beverage which has a smooth, mild pleasant taste and is free of any astringent bitterness.

A further object of this invention is to make the tea infusion a more healthful beverage by eliminiating the hepatotoxic effect associated with its usual high content of tannins.

An additional object of this invention is to produce a tea preparation such that it may be used by the ultimate consumer to make my improved tea beverage without any change in the customary infusion procedure now employed.

This invention can also be applied to the preparation of tea concentrates either in liquid or dry form. The tea infusion may be treated in accordance with the technique of this invention either before or after concentrating preliminary to the final evaporation in order to produce a tea concentrate of reduced tannin content.

I have found that if the tea infusion is prepared by steeping the tea leaves in hot water in the presence of a polyamide polymer or resin that the resulting tea beverage is free of tannins without any substantial effect on the flavor or taste other than to eliminate the harsh, bitter astringent off-tastes. The polyamide resins selectively removes the tannins without affecting the other tea constituents. During this steeping the polyamide resin is preferably present in a finely powdered or finely divided filamentous form. By varying the ratio of the weight of the polyamide resin to the weight of tea leaves any proportion of the tannin content can be removed from just a slight removal to complete 100% elimination.

Another means of operating this invention is to prepare the tea infusion in the customary manner and then treat this tannin-containing infusion with the polyamide resin. This can be done either by suspending the finely divided polyamide resin and then removing it by decantation, centrifuging or filtration. The tannin-containing liquor can also be treated by filtration through a bed or pad of the polyamide resin.

Another embodiment of the invention is to prepare a small sack or bag of a size to hold a charge of tea leaves sufficient to prepare a single cup or several cups of tea. A plain tea bag made of materials such as are now used is employed and the bag is loaded with a charge of tea leaves mixed with the polyamide resin.

In the case of the preparation of the tea concentrates, the tea infusion can be made either with the polyamide polymer present during steeping or the tannin-containing infusion can be treated later with the polyamide resin before or after preliminary concentration.

Of the polyamide polymers or resins which I have found suitable for the purposes of this invention are those of the nylon type such as: 66 nylon the polymer formed from hexamethylene diamine and adipic acid, 610 nylon formed from hexamethylene diamine and sebacic acid, 6 nylon prepared from caprolactam, 11 nylon polymerized from w-amino undecanoic acid. For economy of use, these polymers should be in a fine state of subdivision as their effectiveness is increased per unit weight as the surface area increases.

The following examples are given for purposes of illustration and to make the workings of this invention clearer and are not to be construed as limiting as to the quantities involved, the types of teas or in any other detail that would be obvious to one skilled in the art.

*Example I.*—For the convenience of the ultimate consumer, tea is packaged in small water permeable sacks, known as tea bags. These are commonly made of a cellulosic fabric and contain a measured portion of tea leaves. In use these bags are immersed in a cup or pot of hot water to prepare the tea infusion for drinking. To obtain removal of the tannins, I add to the tea leaves contained in the bag proportions of 66 nylon in finely divided form. The optimum level of addition is adjusted depending upon the effect desired and the efficiency of the tannin removal by the nylon container.

*Example II.*—A tea bag composed of the customary cellulosic materials now in use is charged with 2.4 grams of a mixture containing 89% of a blend of pekoe, orange pekoe and black tea and 11% of powdered 66 nylon. This tea bag is used in the customary manner to prepare a cup of tea. The tea infusion resulting therefrom has all the pleasant aroma qualities of the untreated tea infusion but the taste is vastly superior because there is no bitter, astringent or harsh taste. This is due to the substantially complete removal of the tannin bodies by the nylon during steeping. The tea is also more healthful to the drinker because it no longer has an hepatotoxic effect in the body.

*Example III.*—Bulk tea leaves can be improved by mixing finely divided filamentous or powdered 66 nylon or 610 nylon in the proportions of about 0.1% to about 80% of the nylon on the weight of tea, depending upon the type of tea being used and the extent of the tannin removal desired. In general the Formosa oolong teas and the Java black teas have a higher tannin content than the China or Indian black teas and thus these teas with the higher tannin content would require a higher level of nylon treatment to effect the same degree of tannin removal. Since most of these teas are used as blends and the tannin contents vary from lot to lot the desired degree of tannin removal by the nylon treatment is best determined for each batch. This can be easily done by using either the taste or simple chemical tests for tannins as the criteria. This makes for the most economical use of the nylon treatment. This is not absolutely essential to the practice of this invention as a basic level can be established for a particular blend of teas and a particular efficiency of tannin removal. For instance, the incorporation of 7.0% of powdered 66 nylon in a blend of orange pekoe and pekoe cut black tea gives a mild, well-flavored tea beverage with no perceptible bitterness or astringency and with the tannin content reduced 60%. The use of about 3% of 66 nylon admixed with this tea reduced the tannins about 40 to 50% of what it was in the plain infusion of tea leaves prepared under similar steeping conditions. The use of about 15 to 20% of the powdered polyamide resin will give a tea infusion practically free of tannin bodies with over 90% removed. The fineness of subdivision of the polyamide resin affects the efficiency of the tannin removal. The figures given above refer to a finely powdered material passing through a 100 mesh sieve. For use in tea bags I prefer to use a somewhat coarser nylon such as that passing through a 60 mesh sieve and retained by 100 mesh sieve, thus sacrificing some tannin-removing efficiency in order to prevent the nylon fines from passing through the pores of the tea bag into the tea beverage. Any of these fines that escape from the tea bag, settle out and deposit on the bottom of the cup as a dark colored, unsightly sediment.

*Example IV.*—A mixture is prepared comprising 80% of Darjeeling tea and 20% of 6 nylon powder (passing 60 mesh but retained by 100 mesh), a suitable material can be obtained under the trade name "Plaskon 8200," from Allied Chemical & Dye Corporation, New York 6, N.Y. This is a water insoluble 6 nylon prepared by the polymerization of caprolactam. 2.2 gram quantities of this mixture is sealed into the usual cellulosic tea bags. This amount of tea is enough for the preparation of a cup of mild, non-astringent tea beverage when steeped in the usual manner.

*Example V.*—A tea concentrate with a reduced tannin content and a non-bitter, non-astringent taste can be prepared by treating the tea infusion during steeping or by steeping the tea leaves as usual and then treating the tannin-containing tea infusion with the nylon, then filtering and concentrating. The nylon treatment can also be applied to the untreated tea infusion after evaporation, concentration and removal of the partially precipitated tannin bodies. The nylon treatment will effectively remove those tannins still remaining soluble in the tea concentrate.

Many variations are possible in this invention due to the flexibility of the operating conditions and the wide range of concentrations possible and the types of products involved in the successful practice of this invention. These variations will be obvious to anyone skilled in the art once I have disclosed the basic principles of my invention. It is intended that these variations be considered part of this invention if they come within the scope of the following claims.

I claim:

1. The process of preparing a tea infusion of lowered tannin content comprising steeping the tea leaves in hot water in the presence of a powdered, water-insoluble nylon, and removing said tea leaves and nylon from the infusion.

2. The process of preparing a tea infusion of lowered tannin content comprising steeping the tea leaves in hot water in the presence of a powdered, water-insoluble, nylon, the nylon being present in amounts of 0.1% to 80% of the weight of tea leaves, and removing said tea leaves and nylon from the infusion.

3. The process of preparing a tea infuson of lowered tannin content comprising treating a tannin-containing tea infusion with powdered, water-insoluble 66 nylon and then removing said 66 nylon from the infusion.

4. In the process of making tea beverage from tea leaves, the improvement which comprises mixing a finely divided, water-insoluble nylon with tea leaves and then removing said tea leaves and nylon from the tea beverage.

5. In the process of making tea beverage from tea leaves, the improvement which comprises mixing finely divided, water-insoluble nylon in amounts of 0.1% to 80% of the weight of the tea leaves and then removing said tea leaves and nylon from the tea beverage.

References Cited in the file of this patent

UNITED STATES PATENTS

| | | |
|---|---|---|
| 2,277,050 | Reed et al. | Mar. 24, 1942 |
| 2,721,017 | Hiscock | Oct. 18, 1955 |
| 2,824,002 | Hiscock | Feb. 18, 1958 |
| 2,860,987 | Werner | Nov. 18, 1958 |